United States Patent
Frolov

(10) Patent No.: US 7,301,136 B2
(45) Date of Patent: Nov. 27, 2007

(54) METHOD FOR OPERATING A PHOTOELECTRIC SENSOR ARRANGEMENT WITH INVERTING AND SHIFTING A RECEIVED SIGNAL AND CORRESPONDING SENSOR

(75) Inventor: Vladimir Frolov, Strasbourg (FR)

(73) Assignee: Senstronic Societe Anonyme, Saverne (FR)

( * ) Notice: Subject to any disclaimer, the term of this patent is extended or adjusted under 35 U.S.C. 154(b) by 7 days.

(21) Appl. No.: 11/318,758

(22) Filed: Dec. 28, 2005

(65) Prior Publication Data

US 2006/0163447 A1 Jul. 27, 2006

(30) Foreign Application Priority Data

Jan. 26, 2005 (EP) .................. 05360003

(51) Int. Cl.
*G01V 8/10* (2006.01)
(52) U.S. Cl. .................. 250/221; 340/555; 250/214 R
(58) Field of Classification Search ............ 250/214 R, 250/214 SW, 221, 222.1; 340/555–557
See application file for complete search history.

(56) References Cited

U.S. PATENT DOCUMENTS

| | | | |
|---|---|---|---|
| 4,097,731 A | 6/1978 | Krause et al. | |
| 4,384,194 A | 5/1983 | Jones et al. | |
| 5,883,383 A | 3/1999 | Dragne et al. | |
| 6,600,146 B2 * | 7/2003 | Osako et al. | 250/214 LS |
| 6,953,926 B2 * | 10/2005 | Reime | 250/221 |
| 6,982,408 B2 * | 1/2006 | Maruyama | 250/221 |
| 2003/0222207 A1 | 12/2003 | Bloehbaum | |

FOREIGN PATENT DOCUMENTS

DE        195 25 057        2/1997

* cited by examiner

*Primary Examiner*—Georgia Epps
*Assistant Examiner*—Stephen Yam
(74) *Attorney, Agent, or Firm*—Young & Thompson

(57) ABSTRACT

A method for operating a photoelectric sensor arrangement having a pulsed light emitting first module, a light receiving and converting second module and a level judging and/or processing third module.

The method includes:
  sending periodically light pulses from the first module towards the second module,
  producing an analog potential signal at the second module and transmitting the signal to the third module,
  processing the analog signal at the third module and providing an evaluation or control information or signal depending on the processing results,
  before transmission to the third module, inverting the analog signal produced by the second module and shifting or offsetting the inverted signal, and
  at the third module, measuring the inverted and shifted analogue signal at least once between two successive light pulses and processing the measured value(s).

20 Claims, 3 Drawing Sheets

METHOD FOR OPERATING A PHOTOELECTRIC SENSOR ARRANGEMENT WITH INVERTING AND SHIFTING A RECEIVED SIGNAL AND CORRESPONDING SENSOR

FIELD OF THE INVENTION

The present invention is related to the field of switches, sensors and detectors, in particular passage, presence or displacement sensing devices, and concerns a method for operating a photoelectric sensor arrangement, in particular for processing signals in such an arrangement, and a corresponding sensor arrangement.

BACKGROUND OF THE INVENTION

Such photoelectric sensing devices are able to detect any material object or article which penetrates, passes through, cuts or arrives into the transmission path between a light emitter and a light receiver or cuts the propagation direction of the light emitter. Thus such devices sense the decrease, increase or change of light radiation arriving at a photosensitive component from a corresponding light emitting component, and produce an output signal indicative of said decrease or change or of the presence of an object or article within the transmission path.

The light received by the photosensitive component can be either the light arriving directly from the light emitting component (when the two components are facing each other), or the light reflected by an object or article exposed to the light pulses from the first module.

These photoelectric sensing devices or sensor arrangements generally comprise at least a first module emitting light pulses with a given duration and at a given frequency or with a given period, a second module able to receive and convert the light transmitted by the first module and a third level judging and/or processing module.

In these devices or arrangements light pulses sent by said first module and received by said second module are converted by said latter into an analogue potential signal which is transmitted to the third module via a coupling or connecting capacity.

Said analogue signal is processed by said third module in synchronism with the light pulses, possibly by comparing at least its maximum value with a threshold, and an evaluation or control information or signal is provided by said third module depending on said processing results.

More precisely, the first module produces light pulses and transmits them to the second module. Said second module then exits or produces an analogue potential signal, corresponding to the light received of said second module, and transmits said signal to the third module through a coupling capacity. The analogue signal received through the coupling capacitor at the input of the third module is processed by this latter, possibly by comparing at least its maximum amplitude value with a threshold. Said third module provides an evaluation or control information (data) or signal depending on said processing results.

FIG. 1 of the drawings shows schematically the structure of such a known sensor arrangement.

As can be seen, the first module generally comprises a pulse generator and a light emitting block (for example a LED), possibly associated with a directing component. The second module may comprise a photosensitive block with a photoelectrical converter function, followed by an amplifier. Finally, the third module generally includes a processor unit, preceded or not by a level judging block. In order to synchronise the emitting and processing functions, the pulse generator of the first module preferably drives or sequences the functioning of the processor unit of the third module.

As can be seen from the chronograms a) and b) of FIG. 2, the light emitting component produces short periodical light pulses or flashes which are sent directly or indirectly (by reflection from an object when such an object is present) towards the photosensitive receiver. This operating mode allows to obtain a higher sensitivity of the sensor arrangement and to exclude the influence of a constant or low frequency illumination upon object detection.

The current driving pulses feeding the light emitting component [as shown on FIG. 2 a)], produce at the point X of FIG. 1 the signal represented on FIG. 2 b).

In the known sensor arrangements the signal readings occur within the time interval $\Delta t$ and only the value of the signal during said interval are taken into account. Thus, the signal to be detected must exceed the threshold during said interval $\Delta t$ to be acknowledged by the level judging block.

Nevertheless, it has been noticed that, especially in environments polluted with parasitical or interfering light radiations, the light pulses from the light emitting component can be masked, disformed, distorted or otherwise at least partially altered or suppressed, which leads to an unusable and unexploitable signal at the input of the third module (see FIG. 2 c)).

It is an aim of the present invention to overcome the aforementioned problem.

SUMMARY OF THE INVENTION

To that end, the present invention proposes a method for operating a photoelectric sensor arrangement, in particular for processing signals in such an arrangement, said sensor arrangement comprising a pulsed light emitting first module, a light receiving and converting second module and a level judging and/or processing third module, said method comprising the steps of:

sending periodically light pulses from the first module towards the second module, directly or indirectly, producing an analogue potential signal corresponding to the received light at said second module and transmitting said signal to the third module through a coupling capacity, processing the analogue signal at said third module in synchronism with the light pulses, possibly by comparing at least its maximum value with a threshold, and providing an evaluation or control information or signal depending on said processing results, method characterised in that it comprises the steps of:

before transmission to the third module, inverting the analogue signal produced by the second module and shifting or offsetting said inverted signal by a value equivalent to the maximum absolute value or maximum negative value reached by said inverted analogue signal during the concerned period, and at the third module, measuring said inverted and shifted analogue signal at least once between two successive light pulses and processing the measured value(s).

The present invention also proposes a photoelectric sensor arrangement of the type described herein before and corresponding to the preamble of claim 9, which shows the features mentioned in the characterising part of said latter claim.

BRIEF DESCRIPTION OF THE DRAWINGS

The invention will be better understood thanks to the following description and drawings of embodiments of said invention given as a non limitative example thereof.

In the accompanying drawings.

DETAILED DESCRIPTION OF THE INVENTION

Figure 3:
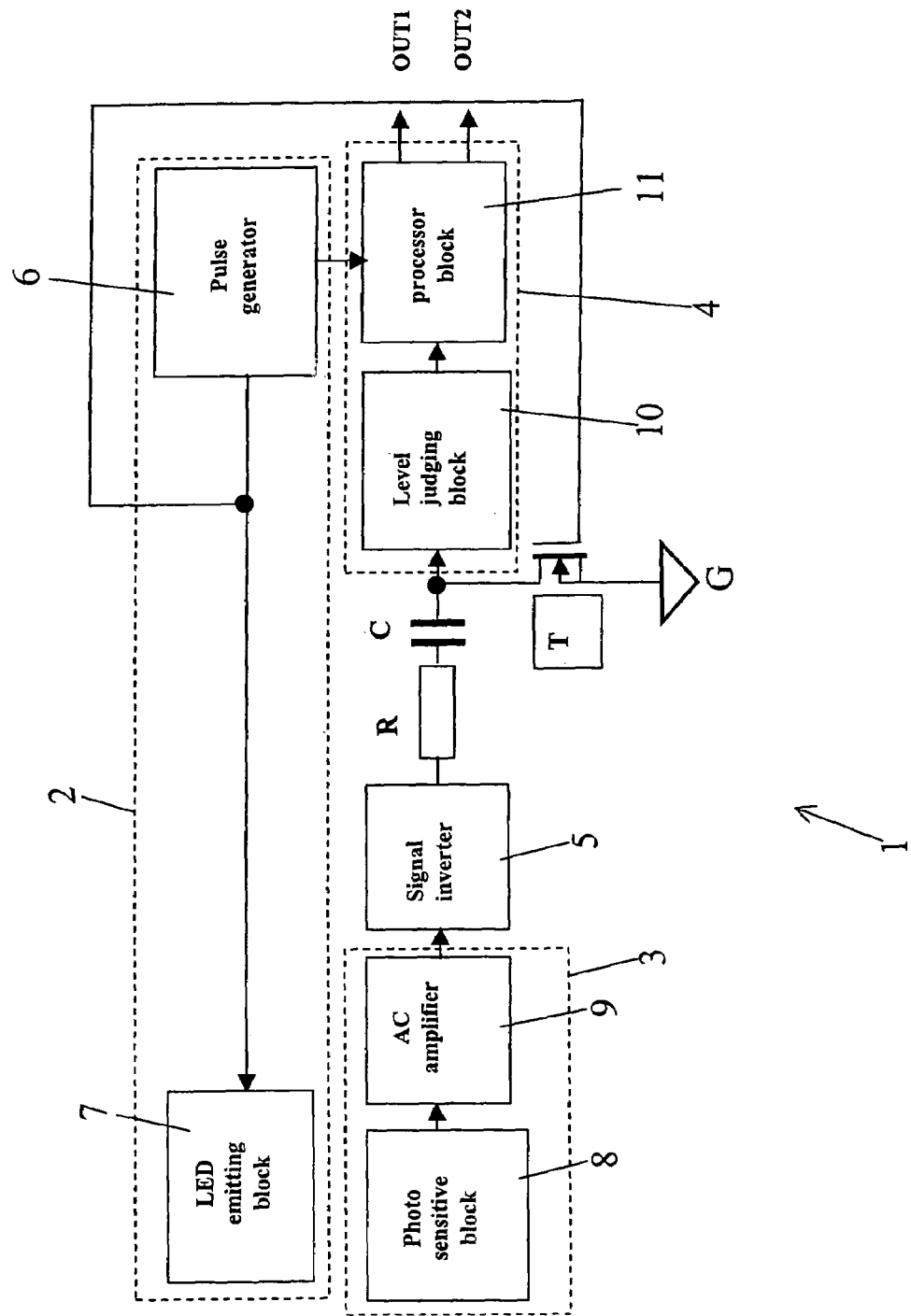
FIG. 3 is a block diagram or skeleton representation of a photoelectric sensor arrangement according to the invention.

As can be seen schematically on FIG. 3 of the drawings, the sensor arrangement 1 comprises a pulsed light emitting first module 2, a light receiving and converting second module 3 and a level judging and/or processing third module 4.

In order to operate such a sensor arrangement 1, the following steps are repeatedly carried out:

sending periodically light pulses from the first module 2 towards the second module 3, directly or indirectly, producing an analogue potential signal corresponding to the received light at said second module 3 and transmitting said signal to the third module 4 through a coupling capacity C, processing the analogue signal at said third module 4 in synchronism with the light pulses, possibly by comparing at least its maximum value A1 with a threshold TH, and providing an evaluation or control information or signal depending on said processing results.

According to the invention, the following additional steps are also performed:

before transmission to the third module 4, inverting the analogue signal produced by the second module 3 and shifting or offsetting said inverted signal by a value equivalent to the maximum absolute value or maximum negative value A1 reached by said inverted analogue signal during the concerned period, and at the third module 4, measuring said inverted and shifted analogue signal at least once between two successive light pulses and processing the measured value(s).

Figure 1:
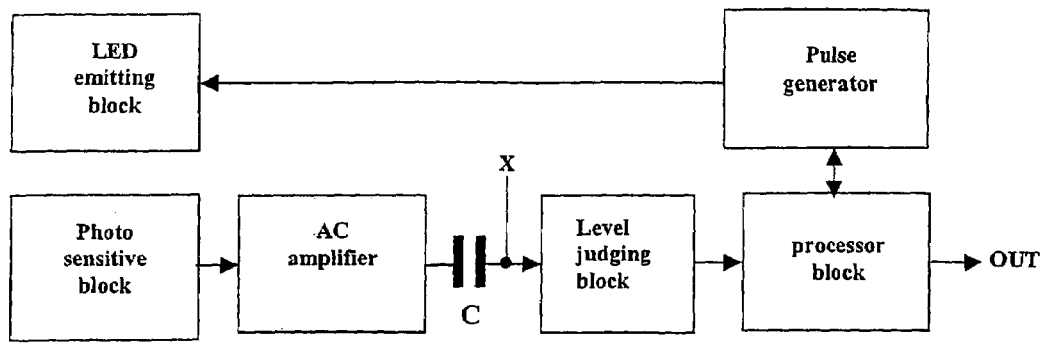
FIGS. 1 and 2 are chronograms illustrating the prior art.
Figure 2:
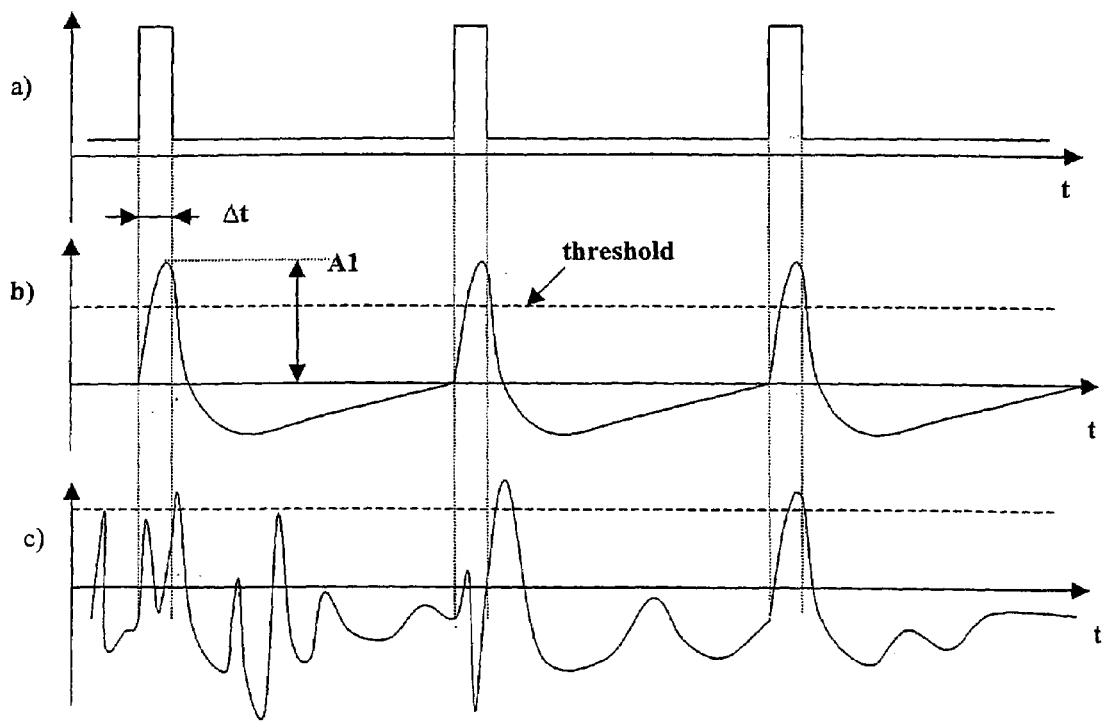
Figure 4:
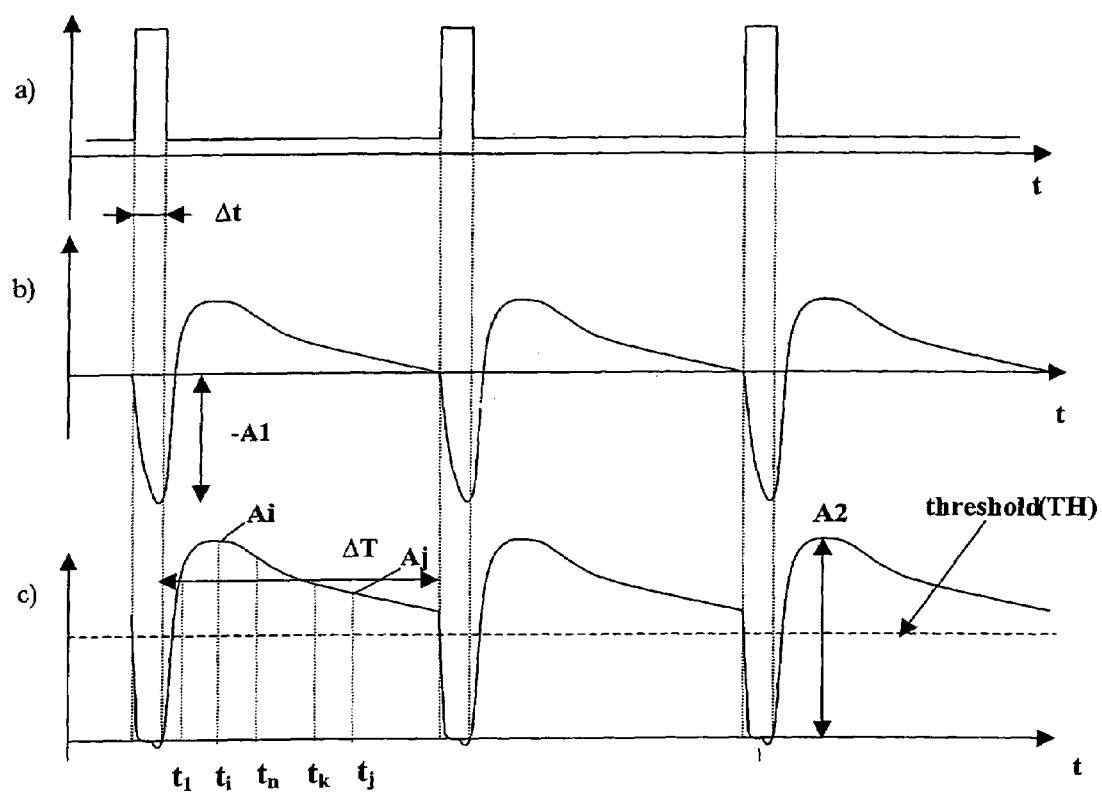
FIG. 4 represents chronograms similar to the ones of FIG. 2, showing respectively the pulsed driving signal delivered to the light emitting component (a), the analogue electrical signal produced by the second module after having been inverted (b) and said inverted analogue signal after having been shifted (c), i.e. as seen by the third module.

The main advantages of the invention become clearly and easily apparent by comparing the chronograms of FIG. 2 c) and of FIG. 4 c), i.e. the maximum amplitude value A2 is notably greater than A1 and the time interval ΔT for carrying out the measurements several times longer than Δt. Thus the invention allows to extract the same information of the initial optical signal as by the known arrangements, but under much better conditions and in a much more reliable and interference free way.

In accordance with a first embodiment of the invention, only one measurement operation is performed between at least two successive light pulses, preferably at the point of maximum amplitude A2 of the inverted and shifted analogue signal.

Alternatively and in accordance with a second preferred embodiment of the invention, at least two, and advantageously more than two, measurements are performed between at least two successive light pulses, said measurements being spaced in time and at least one of them being performed at the point of maximum amplitude A2 of the inverted and shifted analogue signal.

Preferably, the first module 2 is continuously emitting light pulses with a given, possibly adjustable, frequency or period and the third module 4 is performing measurement and processing operations during each or certain only of the time intervals ΔT between two consecutive light pulses.

In order to increase the reliability of the sensor arrangement 1, and to reduce the weight of a contradictory measurement and avoid the doubt generated by such an erroneous value Ai or Aj, it can be proposed that several measurement operations are performed during one or several consecutive time interval(s) ΔT between two light pulses and that an average value is computed from the measured values Ai of each time interval ΔT, or of all considered time intervals ΔT, and used for processing purposes.

According to an additional optional feature of the invention, the invention can also consist in evaluating the number of measured amplitude values Ai which exceed the threshold TH and consequently evaluating or estimating the signal intensity or quality of information provided by said signal upon the results of said evaluation or estimation.

Furthermore, the invention can also consist in timely shifting, during a consecutive time interval ΔT between two light pulses, the temporal location ti of the occurrence of one or at least one of the measurement operations which have (has) provided a signal amplitude value Ai inferior to the threshold TH during the previous time interval ΔT, so that this timely shifted measurement operation is performed at a temporal location ti nearer to the temporal location tj of a measurement operation which has provided a signal amplitude value Aj superior to the threshold TH, preferably nearer to the temporal location t2 of the measurement operation having provided the maximum amplitude value A2, and in evaluating said time shifting in terms of signal information.

Thus, by fixing moments of readings (see FIG. 4 c): t1, ti, tn, tk, tj), one can estimate the signal intensity by means of a software (without the additional level judging block 10) within the processor block 11 and indicate a result at the output. As it follows from FIG. 4 c), there are time zones of the signal where it fluently grows and drops. If only one reading ti exceeds the threshold, one can estimate the signal as weak. If both, two or more readings ti, tj exceed the threshold, one can conclude that the signal is strong and indicate it at the output of the processor block 11. It is also possible at that moment to shift tj to the place tk of a bigger value of the signal (shifting to the left on FIG. 4 c)) and thus to provide a hysteresis against the noise.

The invention also proposes a photoelectric sensor arrangement 1 comprising at least a first module 2 emitting light pulses with a given duration and at a given frequency or with a given period, a second module 3 able to receive and convert the light transmitted by the first module 2 and a third level judging and/or processing module 4. Light pulses sent by said first module 2 and received by said second module 3 are converted by said latter into an analogue potential signal which is transmitted to the third module 4 via a coupling or connecting capacity C. Said resulting analogue signal is processed by said third module 4 in synchronism with the light pulses, possibly by comparing at least its maximum value A2 with a threshold TH, and an evaluation or control information or signal is provided by said third module 4 depending on said processing results.

According to the invention, said sensor arrangement 1 also comprises means R, T, 5 for inverting the analogue signal produced by the second module 3 and shifting or offsetting said inverted signal by a value equivalent to the maximum absolute value or maximum negative value A1 reached by said inverted analogue signal during the concerned period, said inverted and shifted analogue signal being measured at least once between two successive light pulses and the measured value(s) Ai being processed by said third module 4.

As illustrated by FIG. 3, the first module can comprise a pulse generator 6 delivering driving signals to a light emitting block 7 (LED), the second module can comprise a photosensitive block 8 (photoreceptor) followed by an AC amplifier 9 and the third module can comprise a processor block or unit 11, preceded or not by a level judging block 10.

As shown on FIG. 3 and in accordance with a possible practical embodiment of the invention, limiting the needed additional components and the structural modification of the previous known sensor arrangements, the means for inverting and shifting the analogue signal produced by the second module 3 consist of a signal invertor 5 and a resistor R connected in series between the second module 3 and the coupling capacity C and of a transistor T having its outputs respectively connected to the input of the third module 4 and to the ground G and its driving input connected to the output of a pulse generator 6 belonging to the first module 2.

The functioning characteristics of the sensor arrangement 1 depend on both the duration of current pulses flowing through the LED 7 and time constant of the RC circuit shown on the FIG. 3. During current pulse passing through LED 7 (FIG. 4 a)) the transistor T is open and the capacitor C is charged to the negative potential −A1 within Δt, as the invertor 5 makes the signal inverted after AC amplifier 9 according to FIG. 4 b). During the complementary time interval ΔT of the pulse period, transistor T keeps a closed state and the signal at the output of the invertor 5 passes to the level judging block 10 having a high input resistance. The negative potential −A1, which is retained by capacitor C, is summarized with the signal at that stage, and produces an equivalent shifting of said inverted signal (FIG. 4 c)).

By way of example, the third module 4 can produce a two state output signal or two outputs of opposite states, thus realising an optical switch.

The present invention is, of course, not limited to the preferred embodiment described and represented herein, changes can be made or equivalents used without departing from the scope of the invention.

The invention claimed is:

1. Method for operating a photoelectric sensor arrangement, said sensor arrangement comprising a pulsed light emitting first module, a light receiving and converting second module and a level judging and/or processing third module, said method comprising the steps of:
   sending periodically light pulses from the first module towards the second module, directly or indirectly,
   producing an analogue potential signal corresponding to the received light at said second module and transmitting said signal to the third module through a coupling capacity,
   processing the analogue signal at said third module in synchronism with the light pulses, and providing an evaluation or control information or signal depending on said processing results, method characterised in that it comprises the steps of:
   before transmission to the third module (4), inverting the analogue signal produced by the second module (3) and shifting or offsetting said inverted signal by a value equivalent to the maximum absolute value or maximum negative value (A1) reached by said inverted analogue signal during the concerned period, and
   at the third module (4), measuring said inverted and shifted analogue signal at least once between two successive light pulses and processing the measured value(s).

2. Method according to claim 1, characterised in that one measurement operation is performed between at least two successive light pulses, at the point of maximum amplitude (A2) of the inverted and shifted analogue signal.

3. Method according to claim 1, characterised in that at least two measurement operations are performed between at least two successive light pulses, said measurements being spaced in time and at least one of them being performed at the point of maximum amplitude (A2) of the inverted and shifted analogue signal.

4. Method according to claim 3, characterised in that more than two measurement operations are performed between at least two successive light pulses.

5. Method according to claim 1, characterised in that the first module (2) is continuously emitting light pulses with a given, possibly adjustable, frequency or period and in that the third module (4) is performing measurement and processing operations during each or certain only of the time intervals (ΔT) between two consecutive light pulses.

6. Method according to claim 3, characterised in that it consists also in evaluating the number of measured amplitude values (Ai) which exceed the threshold (TH) and consequently evaluating or estimating the signal intensity or quality of information provided by said signal upon the results of said evaluation or estimation.

7. Method according to claim 3, characterised in that it also consists in timely shifting, during a consecutive time interval (ΔT) between two light pulses, the temporal location (ti) of the occurrence of one or at least one of the measurement operations which have (has) provided a signal amplitude value (Ai) inferior to the threshold (TH) during the previous time interval (ΔT), so that this timely shifted measurement operation is performed at a temporal location (ti) nearer to the temporal location (tj) of a measurement operation which has provided a signal amplitude value (Aj) superior to the threshold (TH), and in evaluating said time shifting in terms of signal information.

8. Method according to claim 1, characterised in that several measurement operations are performed during one or several consecutive time interval(s) (ΔT) between two light pulses and in that an average value is computed from the measured values (Ai) of each time interval (ΔT), or of all considered time intervals (ΔT), and used for processing purposes.

9. Photoelectric sensor arrangement comprising at least a first module emitting light pulses with a given duration and at a given frequency or with a given period, a second module able to receive and convert the light transmitted by the first module and a third level judging and/or processing module, wherein light pulses sent by said first module and received by said second module are converted by said latter into an analogue potential signal which is transmitted to the third module via a coupling or connecting capacity, and wherein said analogue signal is processed by said third module in synchronism with the light pulses, and an evaluation or control information or signal is provided by said third module depending on said processing results, sensor arrangement characterised in that it also comprises means (R, T, 5) for inverting the analogue signal produced by the second module (3) and shifting or offsetting said inverted signal by a value equivalent to the maximum absolute value or maximum negative value (Al) reached by said inverted analogue signal during the concerned period, said inverted and shifted analogue signal being measured at least once between two successive light pulses and the measured value(s) (Ai) being processed by said third module (4).

10. Sensor arrangement according to claim 9, characterised in that the means for inverting and shifting the analogue signal produced by the second module (3) consist of a signal invertor (5) and a resistor (R) connected in series between the second module (3) and the coupling capacity (C) and of a transistor (T) having its outputs respectively connected to the input of the third module (4) and to the ground (G) and its driving input connected to the output of a pulse generator (6) belonging to the first module (2).

11. Sensor arrangement according to claim 9, characterised in that the third module (4) produces a two state output signal or two outputs of opposite states.

12. Sensor arrangement according to claim 10, characterised in that the third module (4) produces a two state output signal or two outputs of opposite states.

13. Method according to claim 2, characterised in that the first module (2) is continuously emitting light pulses with a given, possibly adjustable, frequency or period and in that the third module (4) is performing measurement and processing operations during each or certain only of the time intervals ($\Delta T$) between two consecutive light pulses.

14. Method according to claim 3, characterised in that the first module (2) is continuously emitting light pulses with a given frequency or period and in that the third module (4) is performing measurement and processing operations during each or certain only of the time intervals ($\Delta T$) between two consecutive light pulses.

15. Method according to claim 4, characterised in that the first module (2) is continuously emitting light pulses with a given frequency or period and in that the third module (4) is performing measurement and processing operations during each or certain only of the time intervals ($\Delta T$) between two consecutive light pulses.

16. Method according to claim 4, characterised in that it consists also in evaluating the number of measured amplitude values (Ai) which exceed the threshold (TH) and consequently evaluating or estimating the signal intensity or quality of information provided by said signal upon the results of said evaluation or estimation.

17. Method according to claim 5, characterised in that it consists also in evaluating the number of measured amplitude values (Ai) which exceed the threshold (TH) and consequently evaluating or estimating the signal intensity or quality of information provided by said signal upon the results of said evaluation or estimation.

18. Method according to claim 4, characterised in that it also consists in timely shifting, during a consecutive time interval ($\Delta T$) between two light pulses, the temporal location (ti) of the occurrence of one or at least one of the measurement operations which have (has) provided a signal amplitude value (Ai) inferior to the threshold (TH) during the previous time interval ($\Delta T$), so that this timely shifted measurement operation is performed at a temporal location (ti) nearer to the temporal location (tj) of a measurement operation which has provided a signal amplitude value (Aj) superior to the threshold (TH), and in evaluating said time shifting in terms of signal information.

19. Method according to claim 5, characterised in that it also consists in timely shifting, during a consecutive time interval ($\Delta T$) between two light pulses, the temporal location (ti) of the occurrence of one or at least one of the measurement operations which have (has) provided a signal amplitude value (Ai) inferior to the threshold (TH) during the previous time interval ($\Delta T$), so that this timely shifted measurement operation is performed at a temporal location (ti) nearer to the temporal location (tj) of a measurement operation which has provided a signal amplitude value (Aj) superior to the threshold (TH), and in evaluating said time shifting in terms of signal information.

20. Method according to claim 6, characterised in that it also consists in timely shifting, during a consecutive time interval ($\Delta T$) between two light pulses, the temporal location (ti) of the occurrence of one or at least one of the measurement operations which have (has) provided a signal amplitude value (Ai) inferior to the threshold (TH) during the previous time interval ($\Delta T$), so that this timely shifted measurement operation is performed at a temporal location (ti) nearer to the temporal location (tj) of a measurement operation which has provided a signal amplitude value (Aj) superior to the threshold (TH), and in evaluating said time shifting in terms of signal information.

* * * * *